United States Patent [19]
Figliuzzi

[11] Patent Number: 6,076,270
[45] Date of Patent: Jun. 20, 2000

[54] INSTANT ANGLE GAUGE

[76] Inventor: Joseph Figliuzzi, HC2, Box 39A, Kelliher, Minn. 56650

[21] Appl. No.: 08/865,376

[22] Filed: May 29, 1997

[51] Int. Cl.[7] .................................................. G01B 3/56
[52] U.S. Cl. ................................. 33/452; 33/1 N; 33/534
[58] Field of Search ............................. 33/1 N, 1 PT, 33/1 AP, 452, 456, 534, 538, 542, 561.1, 561.2, 561.3, 562

[56] References Cited

U.S. PATENT DOCUMENTS

| | | |
|---|---|---|
| 685,372 | 10/1901 | Duncan . |
| 1,135,743 | 4/1915 | Walker ........................................ 33/452 |
| 1,336,102 | 4/1920 | Smith . |
| 1,341,435 | 5/1920 | Olsen .......................................... 33/458 |
| 2,090,835 | 8/1937 | Gardham ..................................... 33/471 |
| 2,245,646 | 6/1941 | Bullivant . |
| 2,607,121 | 8/1952 | Wiedebusch . |
| 2,683,933 | 7/1954 | McFarland ................................. 33/452 |
| 2,735,184 | 2/1956 | Chamberplain . |
| 3,562,919 | 2/1971 | Green ......................................... 33/456 |
| 3,738,012 | 6/1973 | Sherman . |
| 3,871,101 | 3/1975 | Becattini et al. . |
| 3,952,417 | 4/1976 | Bestehorn .................................. 33/471 |
| 4,083,116 | 4/1978 | Dillberg . |
| 4,172,324 | 10/1979 | Meyer ......................................... 33/458 |
| 4,238,888 | 12/1980 | Goldsmith . |
| 4,328,619 | 5/1982 | Levre ........................................... 33/471 |
| 4,338,723 | 7/1982 | Benjamin . |
| 4,376,341 | 3/1983 | Lombardo ................................. 33/458 |
| 4,459,748 | 7/1984 | Byrum . |
| 4,462,166 | 7/1984 | Furlong ..................................... 33/471 |
| 4,513,512 | 4/1985 | Fischer ...................................... 33/471 |
| 4,575,943 | 3/1986 | Baum, Jr. . |
| 4,712,307 | 12/1987 | Kish . |
| 4,744,152 | 5/1988 | Roach et al. .............................. 33/471 |
| 4,756,089 | 7/1988 | Danielsson, III ......................... 33/503 |
| 4,766,675 | 8/1988 | Liu ............................................. 33/534 |
| 4,916,822 | 4/1990 | Johnson .................................... 33/458 |
| 5,020,233 | 6/1991 | Syken ........................................ 33/456 |
| 5,040,443 | 8/1991 | Price . |
| 5,077,910 | 1/1992 | Smith ........................................ 33/760 |
| 5,199,179 | 4/1993 | Baker ........................................ 33/456 |
| 5,361,508 | 11/1994 | Ruggiero . |
| 5,377,419 | 1/1995 | Hesseltine . |
| 5,473,821 | 12/1995 | DiMarco ................................... 33/534 |
| 5,491,906 | 2/1996 | Reilly ........................................ 33/458 |

FOREIGN PATENT DOCUMENTS

| | | | |
|---|---|---|---|
| 288678 | 5/1914 | Germany .................................. | 33/456 |

*Primary Examiner*—G. Bradley Bennett

[57] ABSTRACT

An improved angle gauge comprising a plurality of upright parallel plates hingedly connected to each other, hingedly connected to a movable linear indicator member and hingedly connected to a frame. The frame is grooved to accept a sliding indicator member imprinted with an indicia. The gauge instantly translates an angle reading taken by a forward pair of parallel plates into a linear reading provided by the slidable linear indicator. The hingedly connected forward hinge plates automatically create a flush-fit between two relative surfaces and an angle reading is instantly recorded on the indicia of the linear indicator in combination with the indicia and pointer located on the frame. A finer adjustment can be made with a manual slide button located on the linear indicator.

19 Claims, 11 Drawing Sheets

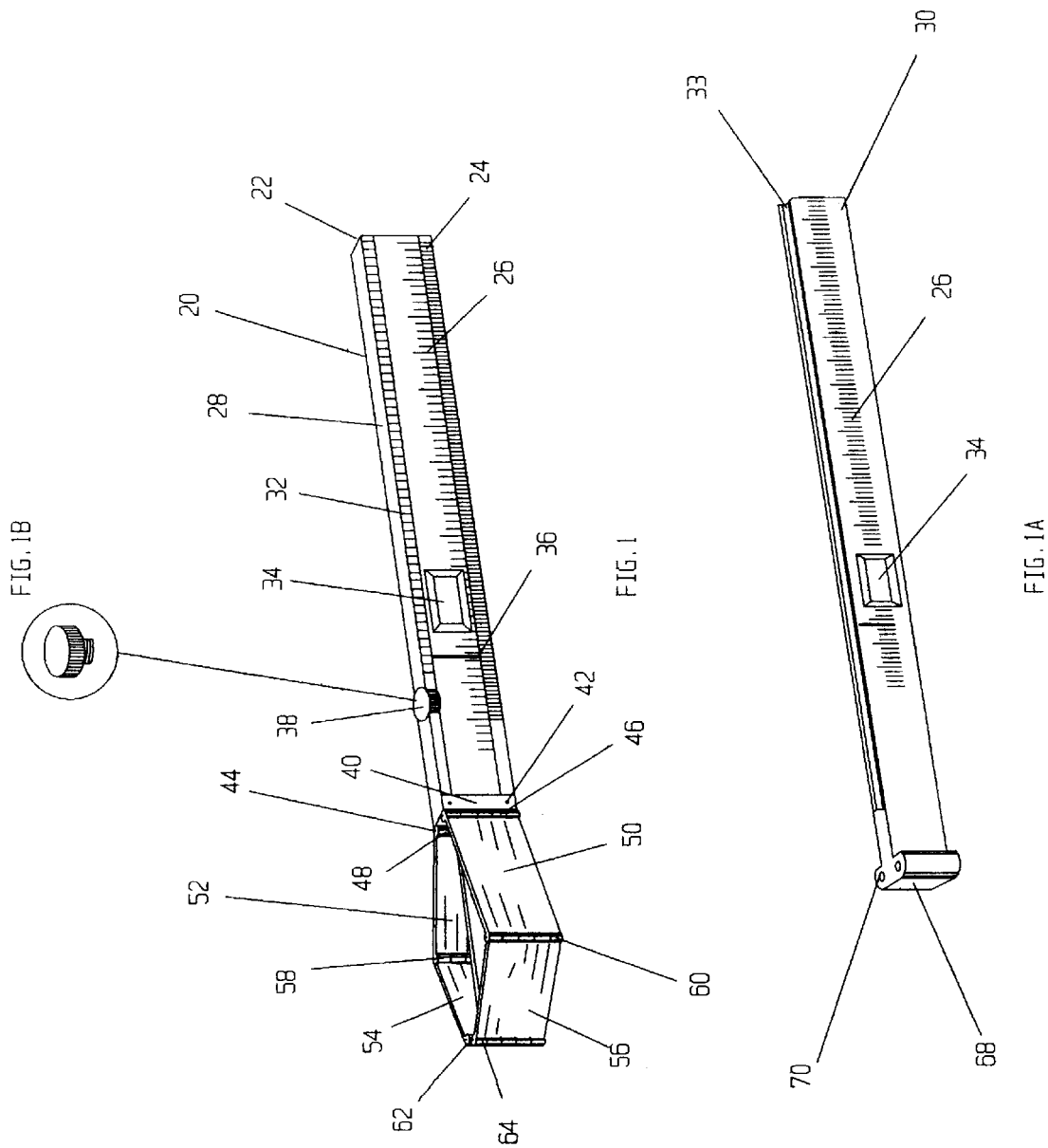

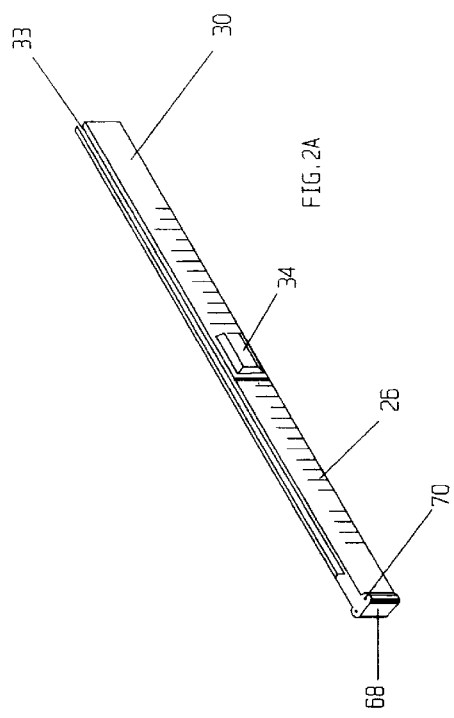
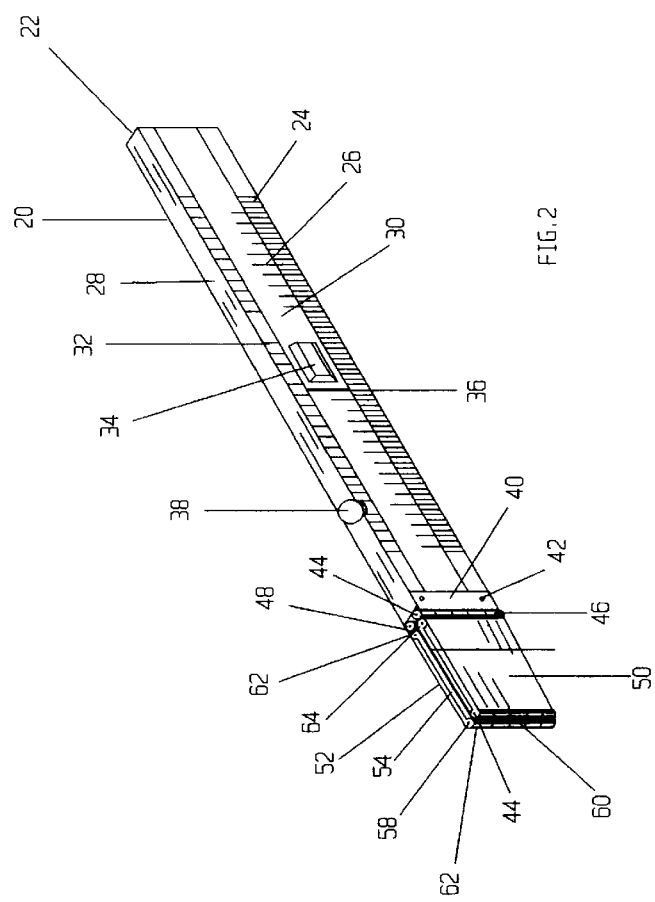

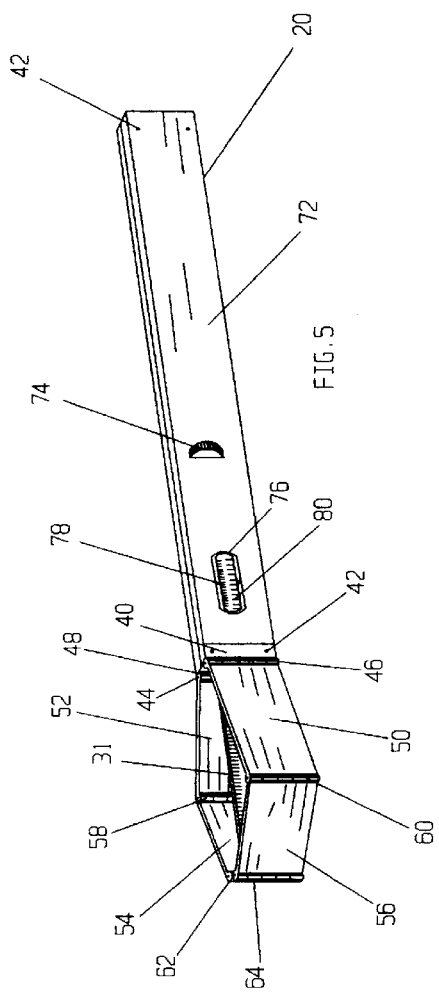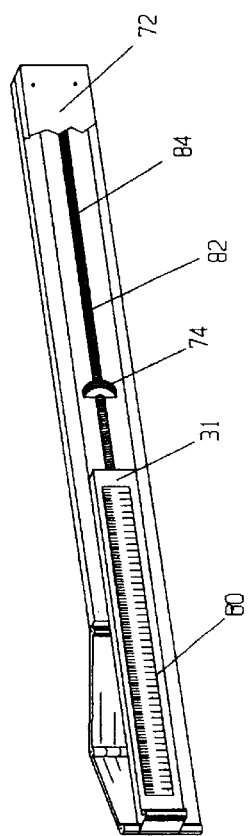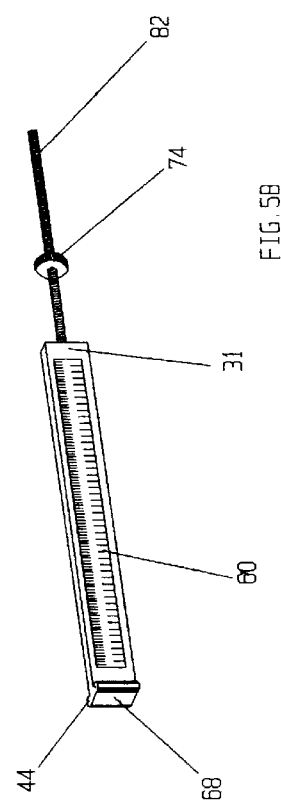

INSTANT ANGLE GAUGE

BACKGROUND OF THE INVENTION

1. Field of the Invention

This invention relates to new and useful improvements in angle measuring instruments.

2. Background Information

There has been a need for an angle measuring device of simple construction that could quickly locate and read, inside and outside angles between two relative surfaces. There has also been a need for an angle gauge that could be easily operated with one hand and without the need for adjustment screws, alignment rods and levers, and other cumbersome means normally used with angle gauges currently available.

There has not been an angle gauge available to match the unique combination of instantly and automatically translating angular measurement onto a linear interface using multiple upright plate sections connected directly with a slidable indicia plate engaged with a grooved frame. Prior art have shown that many of these devices incorporate a protractor method of measurement and display. These gauges are generally slow and inconvenient to use, require both hands to operate, and are not easily portable.

There have been many protractor-type gauges, as disclosed in U.S. Pat. No. 2,607,121 to Wiedebusch and U.S. Pat. No. 4,744,152 to Roach, which are considerably different from the present invention, in that they do not utilize multiple upright plate sections hingedly connected to each other and hingedly engaged to a slidable linear indicia slide plate.

Fischers gauge [U.S. Pat. No. 4,513,512] utilizes a pair of linear indicators attached to a pair of arms pivoted about a common shaft and utilizes a complex driving mechanism consisting of gearwheels, transmission, and belt drives.

The various rafter gauges discovered are tools designed to perform specific tasks. Gardham's tool [U.S. Pat. No. 2,090,835] incorporates parallel arms with protractor-type indicia. Furlong's device [U.S. Pat. No. 4,462,166], and Levre's gauge [U.S. Pat. No. 4,328,619] are essentially pitch and length indicators to measure roof slope and other related rafter layout tasks and cannot measure related and included angles of related surfaces. None of the references show a plurality of upright plates hingedly connected with each other, hingedly connected to a linear indicator, and hingedly engaged with a frame.

OBJECTS AND ADVANTAGES

An important object of the invention is to provide an improved angle measuring instrument that will instantly and automatically find various angles of surfaces relative to one another, by means of a sliding linear indicator hingedly connected with a plurality of upright plate sections.

Another object of the invention is to provide an angle gauge that can quickly translate angular measurement to a linear scale by hingedly connecting a plurality of upright parallel plates with a linear indicator having an indicia.

Another object of the invention is to provide an improved angle measuring gauge which can by operated with one hand, is easily transportable, and can be conveniently carried in one's shirt pocket.

Another object of the invention is to provide an improved angle measuring instrument that may be employed to measure angles between adjacent and angularly related surfaces, including obtuse and acute angles.

Another object of the invention is to provide an improved angle gauge which is versatile and can be used in many applications such as in a machine shop, on a drafting table, on measuring machines, and numerous other applications.

Another object of the invention is to provide an improved angle measuring instrument which is designed to provide a third dimension with upright plate sections, increasing the number of tasks the angle gauge is able to perform and thereby increasing its performance.

Another object of the invention is to provide an improved measuring instrument that can be used as a template for transferring angle configurations to other environments.

Another object of the invention is to provide a multipurpose improved angle gauge which is convenient to use, simply constructed and easy to manufacture and therefore, be made available to the public at a reasonable cost.

Further objects and features of the invention will be apparent from the following specification and claims when considered in connection with the accompanying drawings illustrating the preferred embodiments of the invention.

BRIEF DESCRIPTION OF DRAWINGS

FIG. 1 is a perspective view of a preferred embodiment of an angle measuring instrument in a partially opened position to read an inside angle between two plane surfaces.

FIG. 2 is a perspective view of an angle gauge in a closed position along with a view of a sliding indicator member.

FIG. 5 is a perspective view of an angle gauge showing a threaded rod and threaded control knob combination to advance or retract a sliding indicator member.

DESCRIPTION OF PREFERRED EMBODIMENTS

Figure 3:
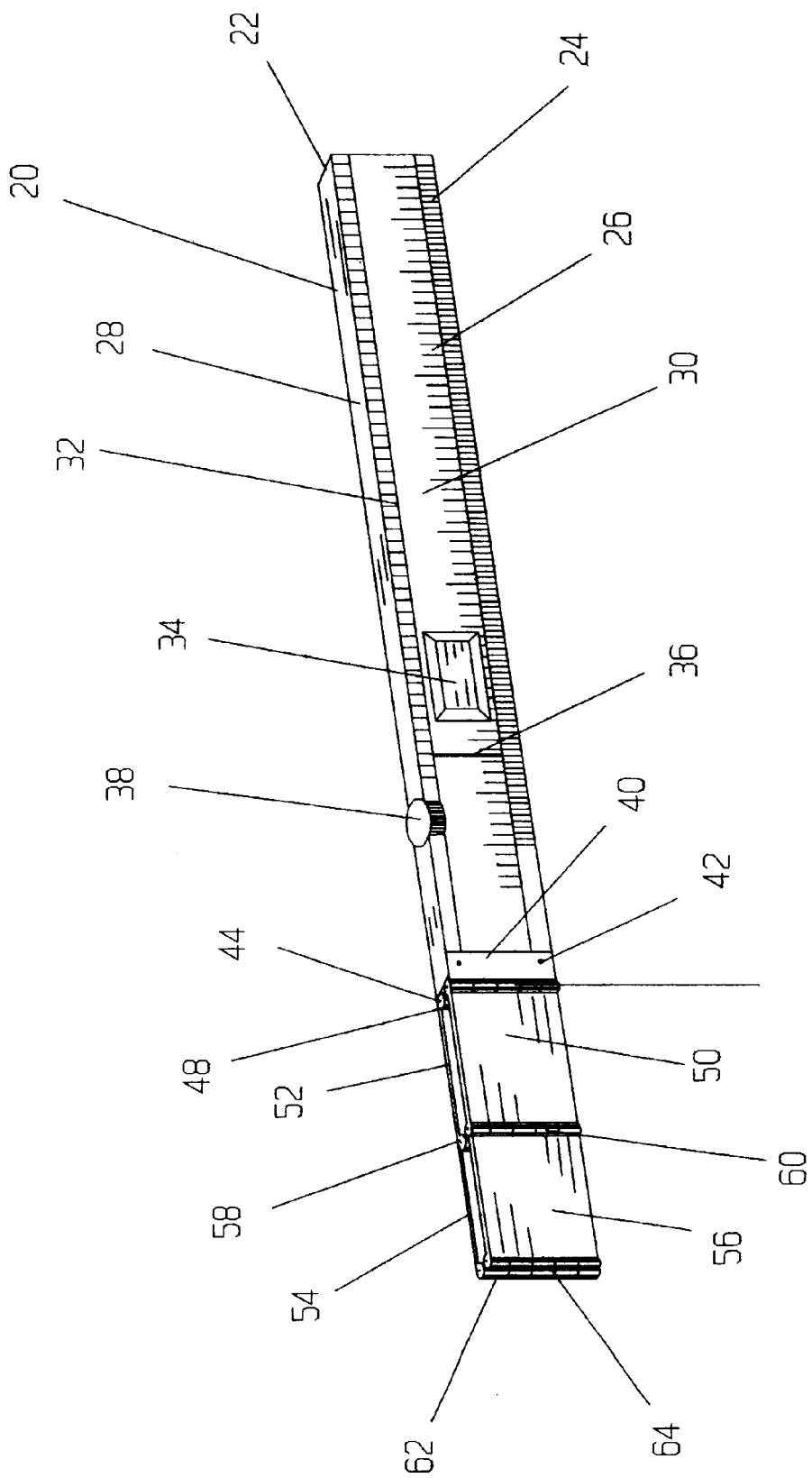
FIG. 3 is a perspective view of a preferred embodiment of an angle gauge in fully opened position.
Figure 4:
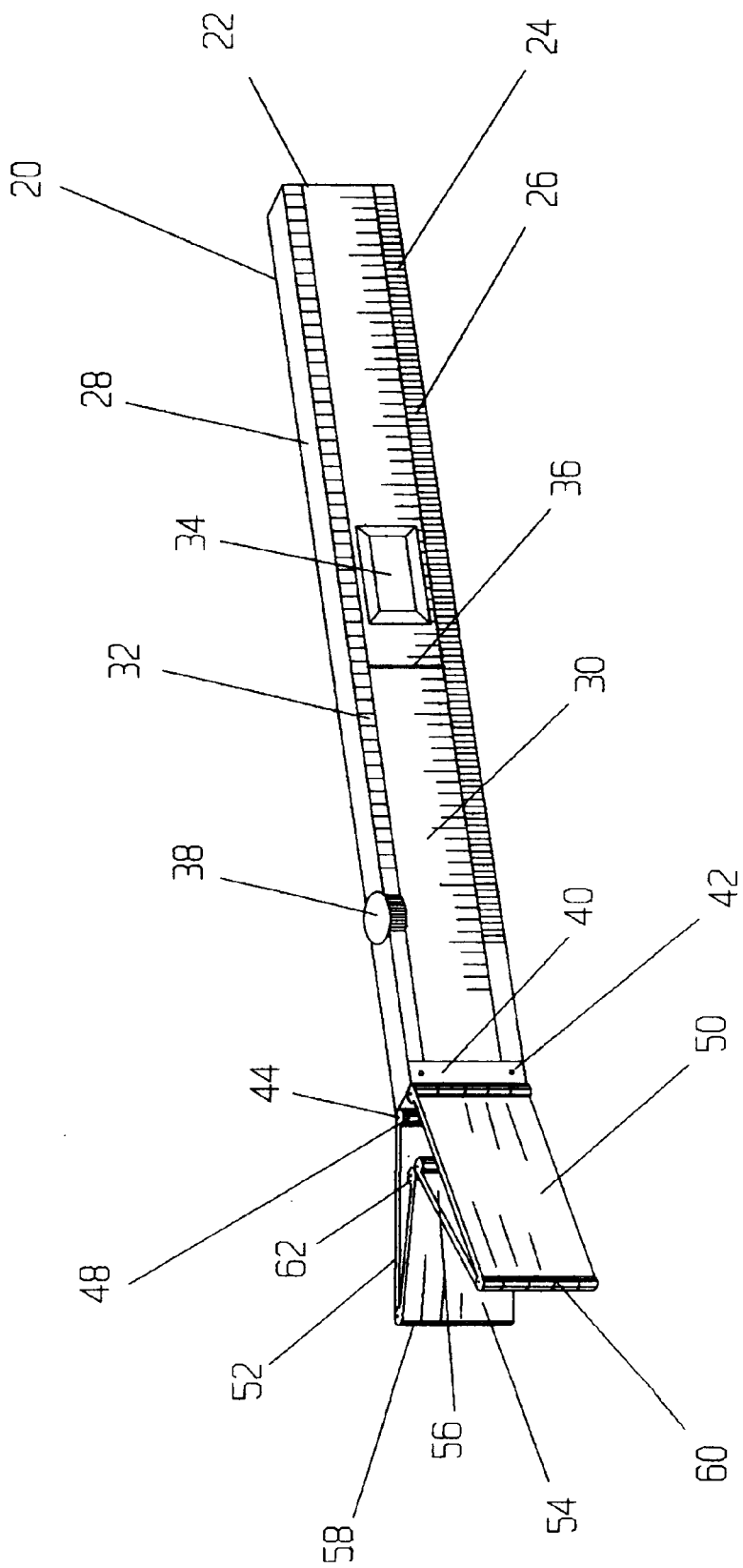
FIG. 4 is a perspective view of a preferred embodiment of an angle gauge in partially opened position prepared to read an outside angle between two plane surfaces.

FIG. 1 illustrates a preferred embodiment in perspective view in which there is shown an angle gauge 20 comprising a frame 28 and a groove 22 which is shaped to receive a sliding linear indicator 30 with a matching indicator joint 68 and indicia 26 inscribed, imprinted or otherwise mounted on indicator 30. Frame 28 also includes indicia 24 and indicia 32 located above and below indicator 30. Angle gauge 20 also comprising two pair of upright parallel plates 50, 52, 54, and 56, with plates 50 and 56 hingedly connected to each other at joint 60 and plates 52 and 54 hingedly connected to each other at joint 58. Forward parallel plates 54 and 56 are also hingedly connected with linear indicator 30 at indicator hinge joint 68 together with hinge joints 62 and 64 and hinge pins 44 and rearward parallel plates 50 and 52 are hingedly connected to frame 20 with hinge joints 46 and 48 and secured to frame 20 with hinge fastening plates 40 and fasteners 42. All hinge joints are joined together with a common hinge pin 44. Angle gauge 20 further comprises a manual slide button 34 which is mounted on sliding indicator 30 so that indicator 30 can be manually moved by thumb action in a linear direction. Angle gauge 20 further comprises a thumb operated locking screw 38 in the frame 20 so that angle readings and settings can be locked at selected desired positions. Hinge joints 46 and 48 and opposing hinge joints 62 and 64 remain on the same axis relative to each other regardless of the degree of movement or position of the upright parallel plates 50, 52, 54, and 56 or the distance traveled by indicator 30. The same hold true for hinge joints 58 and 60 which also always travel toward or away from each other on the same longitudinal axis.

OPERATION

Figure 13:
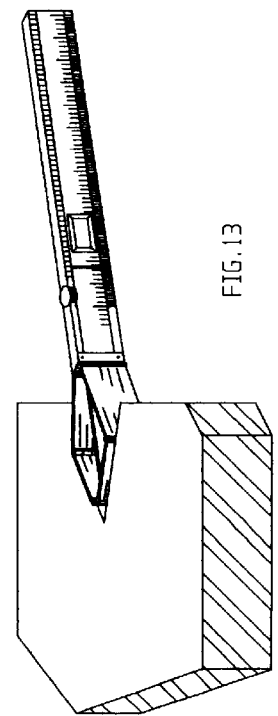
FIG. 13 is a perspective view showing an angle gauge measuring an internal angle of a workpiece.

To find an inside angle between two relative surfaces, the angle gauge 20 is pressed into the cavity area formed by the two surfaces as illustrated in the FIG. 13 example. The forward pair of upright plates 54 and 56 configure themselves instantly and automatically to fit the corresponding surfaces of the object measured, and because the forward pair of upright plates 54 and 30 are directly engaged with linear indicator 30 with indicator joint 68 and hinge joint 62, hinge joint 64 and hinge pin 44, the angular measurement read by plates 54 and 56 directly translated onto a linear scale which includes the combination of linear indicator 30 and indicia 26.

An outside angle is measured in much the same way. The center of the adjoining surfaces of the outside angle is aligned with the cavity created by hinge joints 62 and 64. The gauge is then pressed forward until the forward upright plates configure themselves automatically to fit the outside surfaces of the workpiece. Since plates 54 and 56 are connected with indicator hinge joint 68 the slidable indicator 30 and indicator indicia 26 advance linearly in conjunction with the movement of plates 54 and 56. When plates 54 and 56 come to rest, the corresponding angle is then read on several indicia registers 24,26, and 32, together with indicia pointer 36 located on indicator 30. The angle gauge automatically finds and records the angular measurement taken by the upright parallel plates 54 and 56 and is then translated into linear interface by the linear indicator 30 and transferred to the various indicia 24, 26, and 32 located on frame 28. The manual slide button 34 can be then used to secure a finer adjustment if necessary.

To operate angle gauge 20 as a template, the desired angle setting is selected on the indicator member 30 with manual slide button 34. The setting is secured with locking screw 38 and transferred to the new environment.

The angle gauge 20 can also replicate angles read directly from drawings and blueprints in much the same way. The angle gauge 20 is moved to the selected drawing and plates 56 and 56 are adjusted with manual button 34 or control knob 74 (in the embodiment shown in FIG. 5) until they correspond with the angle selected for reproduction. Locking screw 38 then secures the setting and the selected angle setting is transferred to another environment or workpiece.

When using the angle gauge 20 as a drill gauge or for measuring cutting tool angles, the three dimensional construction provides a convenient stop-rest for drill bit or tool and provides an ongoing reference as the various tools are be ground or otherwise altered to fit a desired setting. The unique construction makes the angle gauge versatile and easily adaptable for use with bench stands or measuring machines.

OTHER EMBODIMENTS

FIG. 5 shows another preferred embodiment which includes a split frame 72 with display slot 76 and indicia pointer 78. The indicia register 80 is inscribed or imprinted on indicator 31 which is attached to threaded rod 82. Indicator member 30 and threaded rod 82 are assembled into grooved split frame 72 as shown in FIG. 5. The forward end of member 30 is hingedly attached to a forward pair of parallel upright plate sections 54 and 56 indicator hinge joint 68 having a hole 70 to accept hinge pin 44. A second rearward pair of parallel upright plates 50 and 52 is hingedly attached to frame 72.

This embodiment differs from the other embodiments listed here in that it does not measure angles automatically. Upright parallel plates 50, 52, 54, and 56 can only be advanced or retracted by turning the manual control knob 74. Whenever the manual control knob 74 is not in use, plates 50,52,54, and 56 remain in a locked position of the last setting. This micrometer style of angle gauge is ideal for the draftsman who needs to make precise adjustments with little effort or without distraction since it requires only a simple thumb action to both move and lock position settings. The upright plates 50, 52, 54, and 56 also make it possible to keep the angle gauge in an upright position on the drawing table where it remains perpendicular to the drawing plane at all times, making it convenient to quickly move the gauge 20 about the drafting board as needed.

Figure 6:
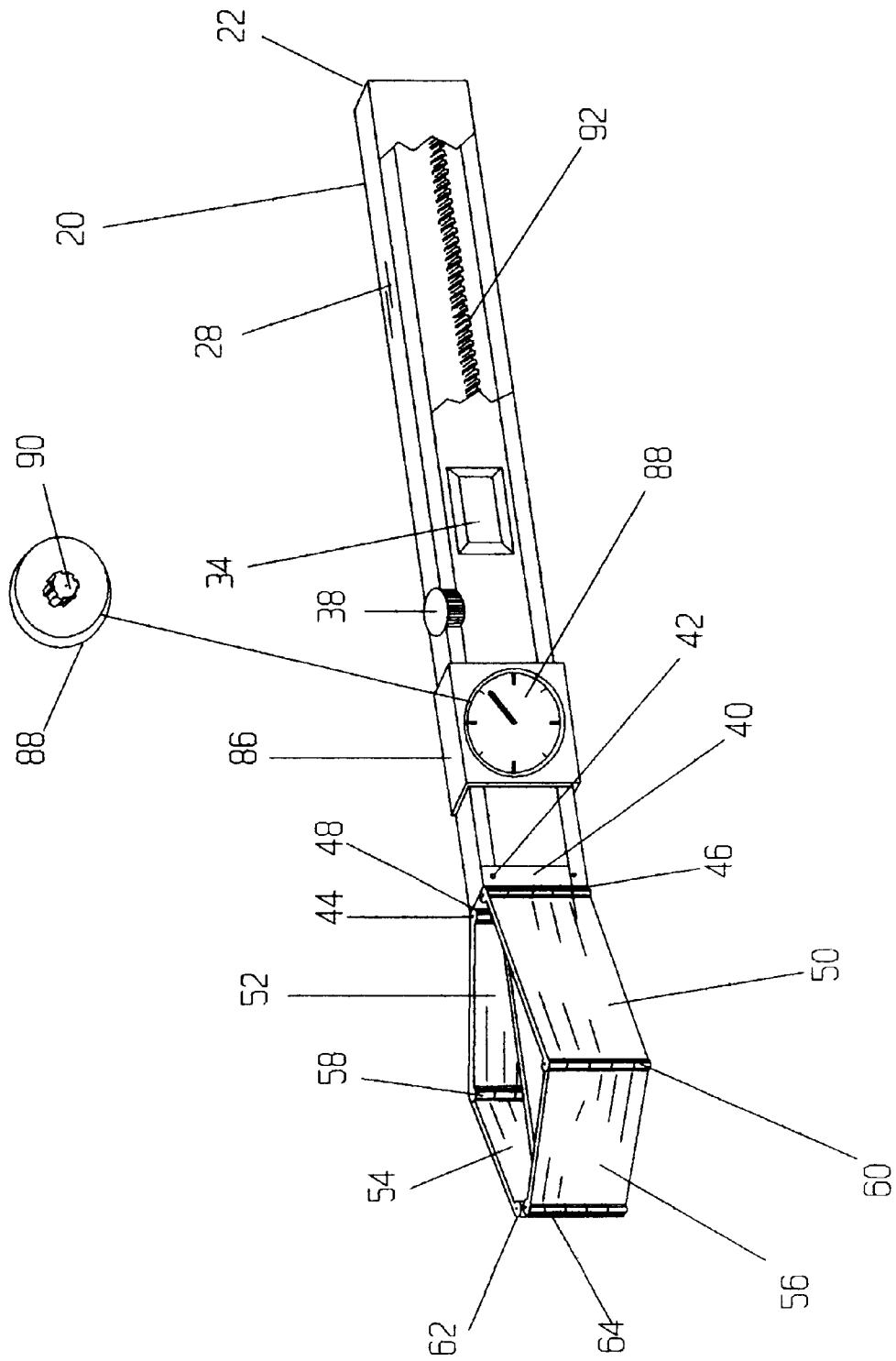
FIG. 6 is a perspective view of an angle gauge which combines a dial indicator type of display device and a rack and pinion movement control mechanism.

FIG. 6 shows a preferred embodiment of angle gauge 20 that provides better control and ease of readability by incorporating a dial indicator 88. This embodiment includes a frame 28 with a groove 22 to receive a slidable gear rack 92 which is made to be engageable with pinion gear 90 which drives the dial indicator 88. The angular measurement read by forward plates 54 and 56 are transmitted directly to the dial indicator 88 by the slidable action of the gear rack 92 in combination with pinion gear 90. This embodiment also comprises a manual slide button 34 and locking screw 38 to lock angle readings at selected settings.

Figure 7:
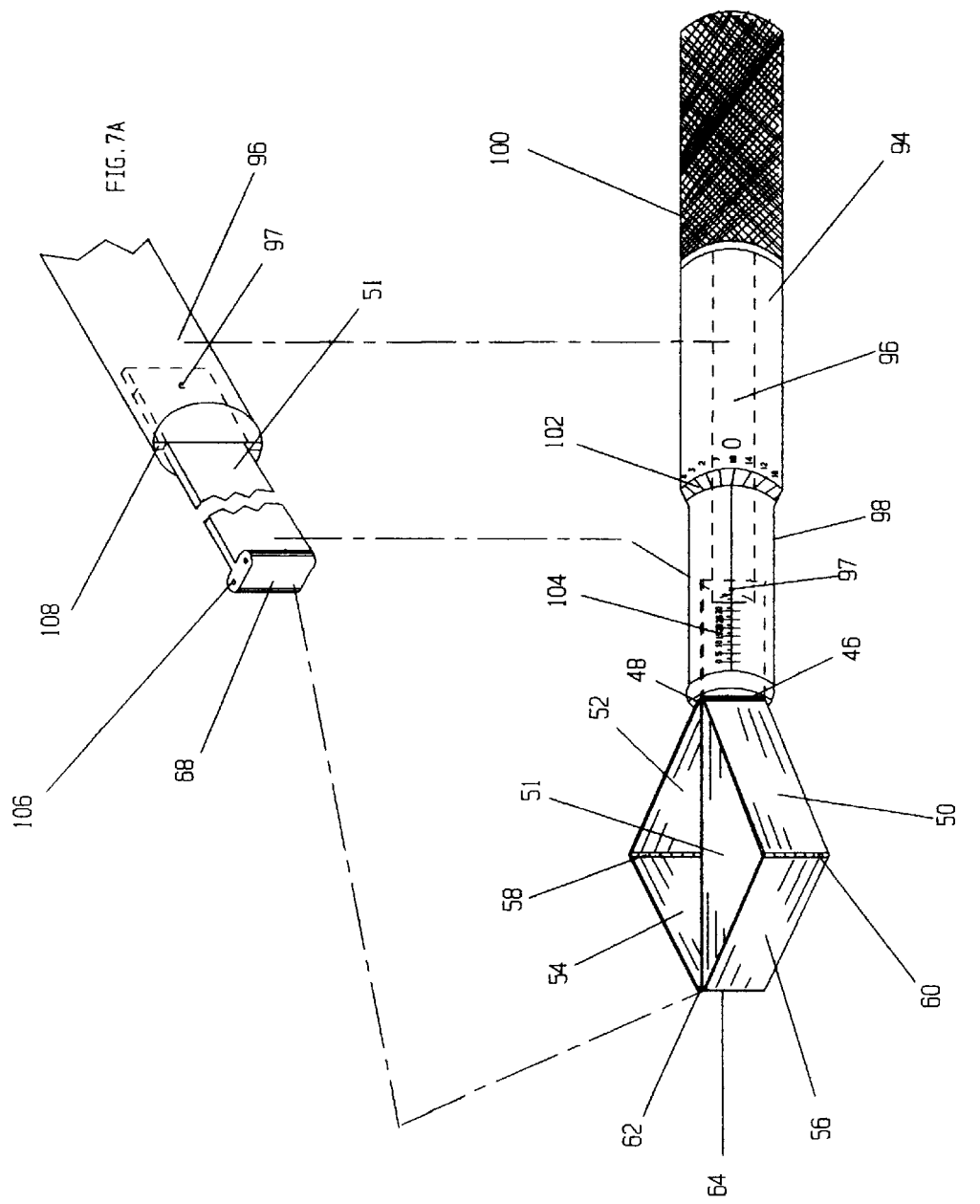
FIG. 7 is a perspective view of an angle gauge, a plurality of upright plates in combination with a micrometer head.

FIG. 7 illustrates another preferred embodiment as an improvement on the above embodiment. FIG. 7 shows an angle gauge 100 comprising a micrometer head with a thimble 94 and a thimble indicia 102 surrounding a sleeve 98 with sleeve indicia 104 and a non-rotating spindle 96. Angle gauge 100 also comprises two pair of parallel upright plates 50, 52, 54, and 56. Hinge plates 52 and 54 are hingedly connected to each other with hinge joint 58 and hinge plates 50 and 56 are hingedly connected to each other with hinge joint 60. Both forward plates 54 and 56 are hingedly connected to indicator hinge joint 68 with plate hinge joints 62 and 64 and hinge pins 44. Linear indicator 51 is joined with spindle 96 at spindle slot 108 with any standard fasten method from a pressed fit to a fastening pin 97 as shown in FIG. 7. Both rearward plates 50 and 52 are hingedly connected to frame 100 with hinge joints 46 and 48. All hinges joints mentioned use pin 44 for securing the hinge joints. Attaching a conventional micrometer head to a plurality of upright parallel plates 50, 52, 54, and 56 hingedly attached to each other and hingedly attached to linear indicator member 51 resulted in new and unexpected benefits. Except for minor changes to the indicia conversion, It was now possible to obtain the precision of a micrometer with the versatility of a new multipurpose angle gauge.

Figure 8:
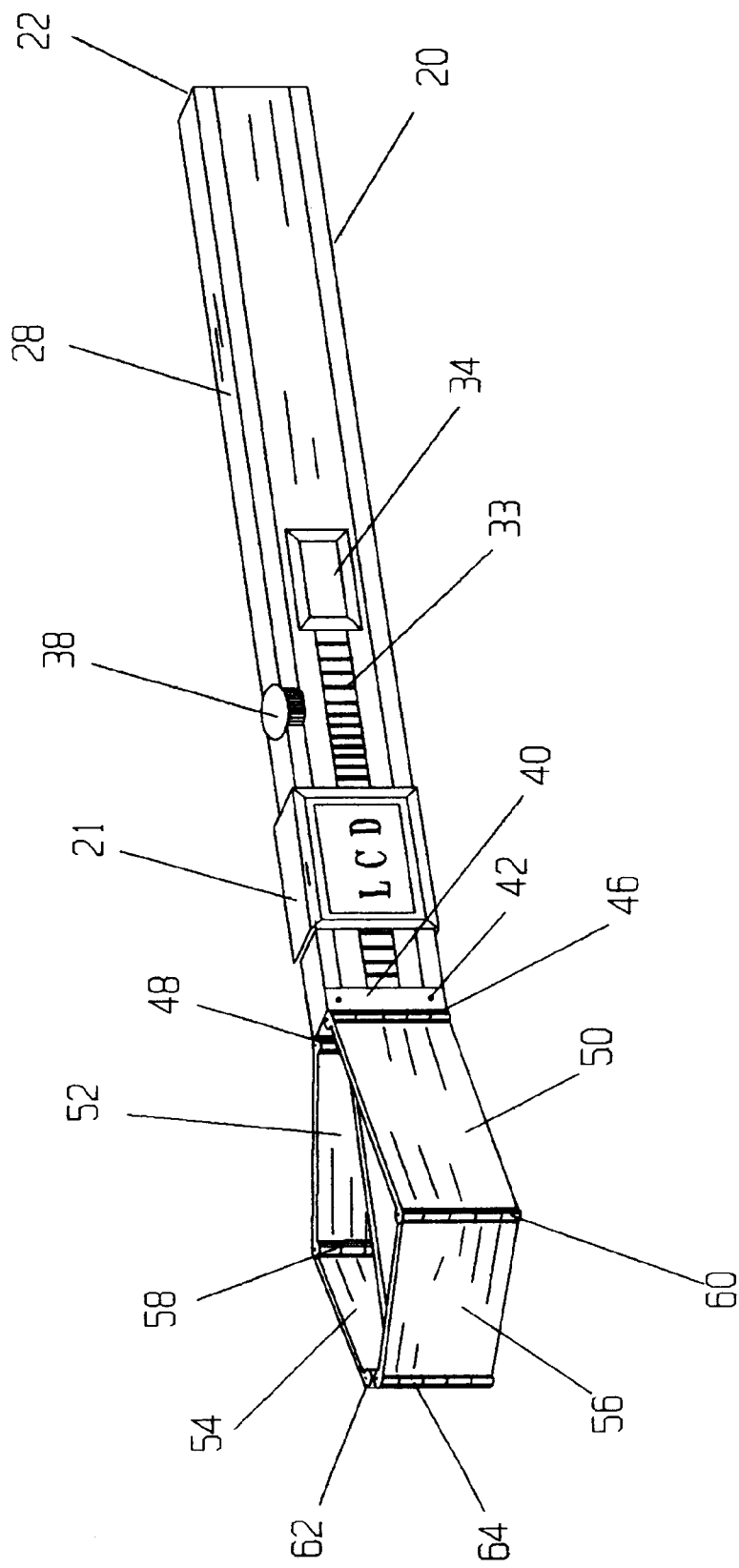
FIG. 8 is a perspective view of an angle gauge which includes a liquid crystal display (LCD) device.

FIG. 8 illustrates another preferred embodiment as an improvement on the above preferred embodiment. Angle gauge 20 comprising a frame 28 including a groove 22 to receive a coded indicator member 33. The forward end of coded indicator 33 is connected to a pair of forward upright parallel plates 54 and 56 with hinge joint 68 and hinge pin 44. Plate 50 is hingedly connected with plate 56 with hinge joint 60 and plate section 52 is hingedly connected to plate 54 with hinge joint 58. Plates 50 and 52 are hingedly connected to the frame 20 with hinge joints 46 and 48. Frame 20 is modified to accept an LCD display device 21 which includes a decoder for digitally interpreting angular measurement read by forward plates 54 and 56. This embodiment also includes a manual slide button 34 and locking screw 38 in the frame 20 to lock angle readings at desired settings. This embodiment improves upon the preferred embodiment above and would considerably increase the accuracy of the angle gauge and would be useful in applications where a high degree of precision is required. Another application for utilizing the LCD embodiment of the angle gauge would be to modify and incorporate this version of the gauge with industrial measuring machines.

Figure 9:
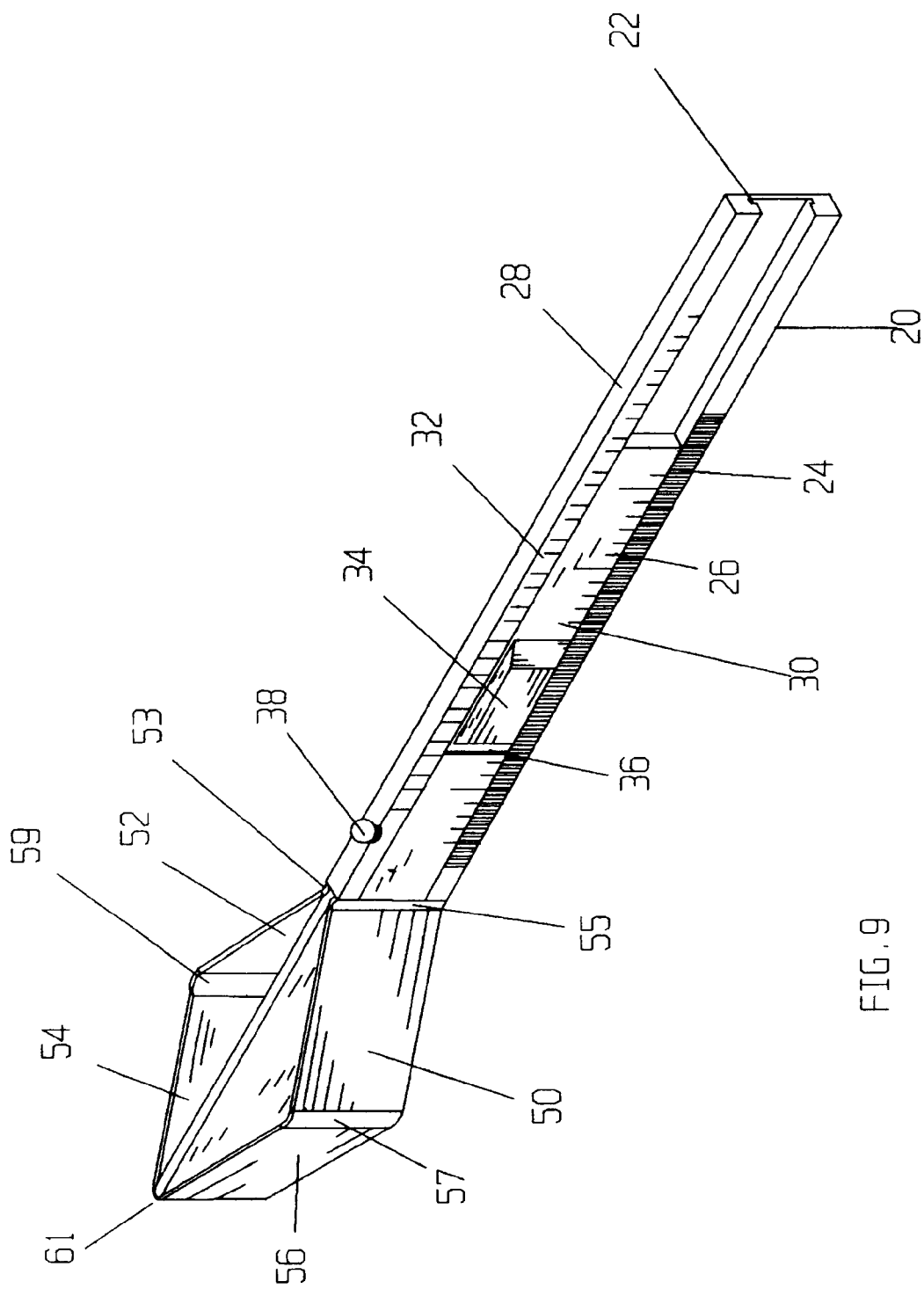
FIG. 9 is a perspective view of an angle gauge which includes upright plate hinges comprised of a flexible material such as polyester elastomers or other similar materials.
Figure 11:
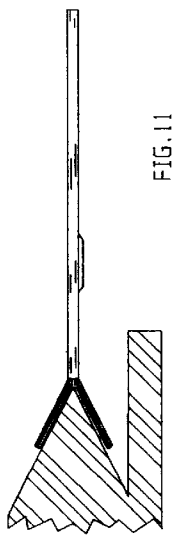
FIG. 11 shows a perspective view of an angle gauge measuring an object when access is restricted by an obstruction.
Figure 12:
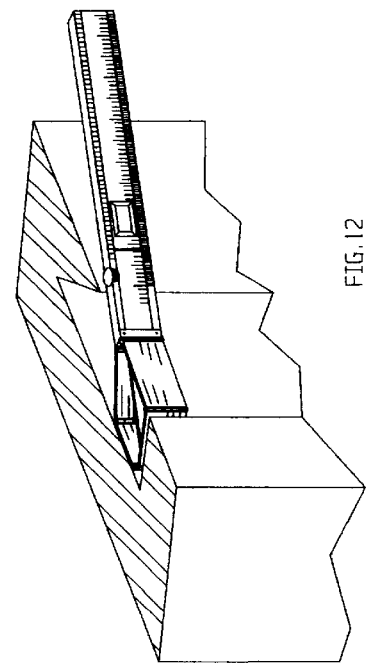
FIG. 12 shows a perspective view of an angle gauge measuring an internal slot such as a dovetail groove.
Figure 10B:
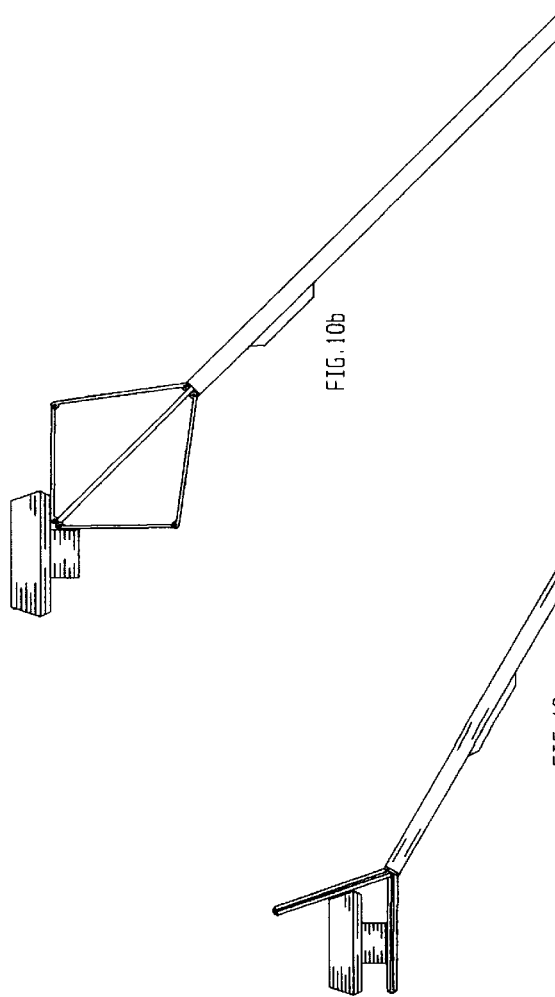
FIGS. 10, 10a, and 10b show the versatility of an angle gauge measuring different angles of the same object and different plane surfaces relative to each other.
Figure 10A:
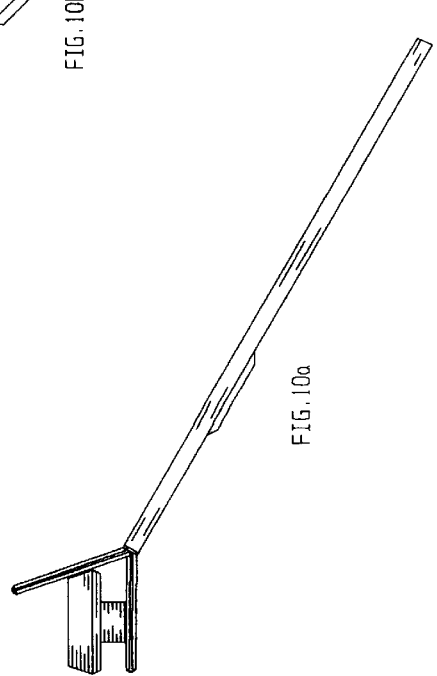
Figure 10:
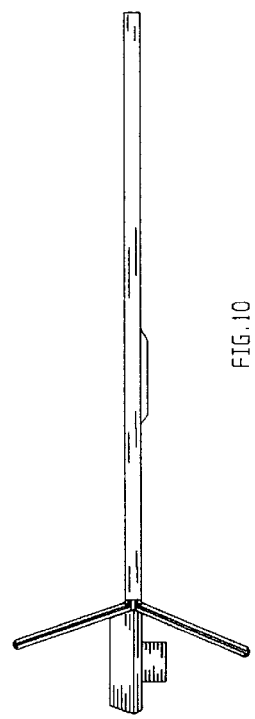
Figure 16:
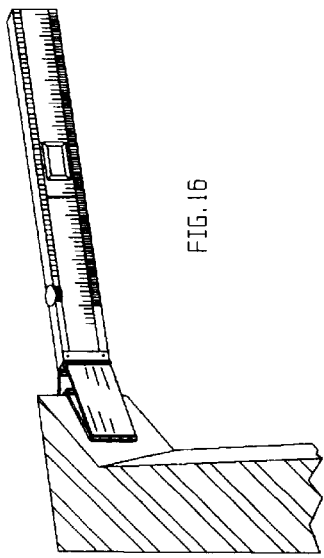
FIG. 16 is a perspective view showing an angle gauge measuring the cutting angle of a machine tool found in shapers, lathes and other similar machines.
Figure 17:
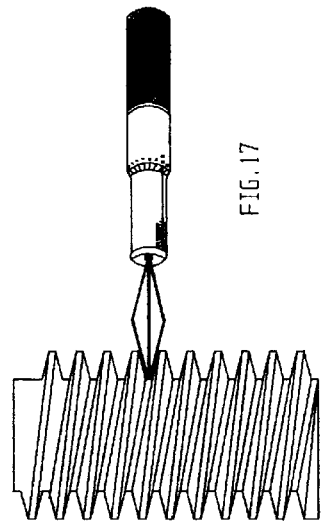
FIG. 17 is a top view of an angle gauge with a micrometer head measuring the inside angle of a worm drive.
Figure 15:
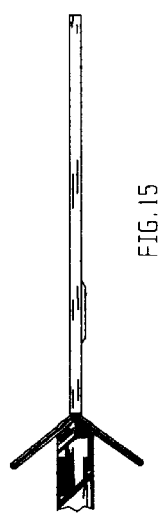
FIG. 15 is a perspective view showing an angle gauge measuring an inclusive angle of a drill bit.
Figure 14:
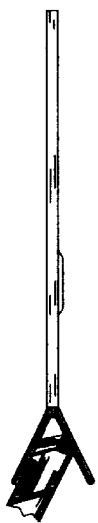
FIG. 14 is a perspective view showing an angle gauge measuring a drill bit angle relative to the longitudinal axis of the tool.

FIG. 9 shows another preferred embodiment of angle gauge 20 above which includes a frame 28 with an indicia register 24 and 32 and a groove 22 to receive linear indicator 30 having an indicia 26 inscribed or imprinted on the face of indicator 30. Upright hinge plates 50 and 56 are hingedly connected with each other at flexible joint 57 and upright hinge plates 52 and 54 are hingedly connected with each other at flexible hinge joint 59. Forward hinge plates 54 and 56 are hingedly connected with linear indicator 30 with flexible hinge 61 and rearward upright plates 50 and 52 are hingedly connected to frame 20 with flexible hinges 53 and 55. Angle gauge 20 further comprises a manual slide button 36 mounted on indicator member 28 to enable linear movement of indicator 30. Angle gauge 20 further comprises a locking screw 38 in the frame 28 so that angle readings can be locked at desired settings. This embodiment replaces the conventional hinge joints 46, 48, 58, 60, 62, and 64 shown in FIG. 1 with hinges made of a polyester elastomer or other similar thermoplastic materials which have a high degree of flexibility and memory, or the ability of the hinge to return to its original position. In addition to the flexible hinge, the entire angle gauge can be economically constructed of plastic material combinations or composites having varying grades of hardness such rigid vinyls. Rigid vinyls bond well with polyester elastomers making it possible to combine 50, 52, 54, and 56 which can be economically produced by using rigid vinyl materials coextruded with thermoplastic materials such as a polyester elastomer mentioned above.

SUMMARY, RAMIFICATIONS, and SCOPE

Accordingly, the reader will see that the combination of a plurality of upright plates, engaged with a sliding indicator comprises many embodiments and can be used for multiple purposes including quickly and automatically finding and measuring angles of all types, including inside angles, outside angles, obtuse angles and acute angles.

Additional advantages of this invention are:

Angles are found instantly and automatically.

It is convenient to use and it can easily be operated with one hand.

It is portable and unobtrusive and can easily be clipped to a shirt pocket.

It can be used as a template to transfer angle configurations to other surfaces.

It is simply constructed and easy to manufacture and therefore made available to the public at a reasonable cost.

The above angle gauge invention provides a simple, low-cost convenient measuring tool that allows substantial versatility in use because of the several modes of operation. Therefore it is to be understood that the invention is not to be limited to the disclosed embodiments, but on the contrary, is intended to cover various modifications and equivalent arrangements included within the spirit and scope of the appended claims.

I claim:

1. An angle gauge comprising:
   (a) a frame with an indicia means mounted on the frame to display angular measurements;
   (b) a plurality of parallel plates hingedly connected to each other and hingedly connected to the frame;
   (c) a transmission means for transferring angular measurements read by the parallel plates onto the indicia mounted on the frame.

2. The angle gauge of claim 1 wherein the parallel plates are upright and hingedly connected to each other and hingedly connected to the frame.

3. The angle gauge of claim 1 wherein the frame is grooved to accept a sliding indicator member.

4. The angle gauge of claim 1 further comprising a linear indicator member hingedly connected with a forward pair of plates for transferring angular measurements onto a linear indicia located on the frame.

5. The angle gauge of claim 1 further comprising a manual slide button attached to the linear indicator member so that the indicator member can move forward in a linear direction within the grooved frame.

6. The angle gauge of claim 1 further comprising a locking mechanism mounted on the frame so that angle readings can be locked at desired settings.

7. An angle gauge comprising:
   (a) a frame, grooved to receive a coded indicator member;
   (b) a plurality of plate sections hingedly connected to each other and hingedly connected to the frame;
   (c) a display means mounted on the frame;
   (d) a linear encoder for digitally interpreting angular measurements made by the plate sections and transmitting data onto the display means mounted on the frame.

8. The angle gauge of claim 7 wherein a coded linear indicator member having a plurality of gradations is hingedly connected with a forward pair of upright parallel plate sections for electronically interpreting the angular measurements read by the forward upright plate sections.

9. The angle gauge of claim 7 further comprising a Liquid Crystal Display (LCD) to interpret the linear reading of the coded linear indicator member and display the results as an angular digital readout.

10. The angle gauge of claim 7 further comprising a locking mechanism is mounted on the frame to lock angle readings at desired positions.

11. The angle gauge of claim 7 further comprising a slide button is mounted on the coded indicator member to move the coded indicator member in a linear direction.

12. An angle gauge comprising:
   (a) a frame;
   (b) a dial indicator with pinion gear drive;
   (c) a plurality of upright parallel plates hingedly connected to each other and hingedly connected to the frame
   (d) a slidable gear rack for transferring angular measurements read by the parallel plates to the dial indicator mounted on the frame.

13. The angle gauge of claim 12 further comprising a locking screw mounted on the frame to secure angle readings at desired positions.

14. The angle gauge of claim 12 further comprising a manual slide button secured to the sliding gear rack to move the gear rack in a linear direction.

15. An angle gauge comprising:
   (a) a grooved frame with an indicia register;
   (b) a plurality of upright parallel plates hingedly connected to each other and hingedly connected to the frame with flexible hinge joints;
   (c) a linear indicator member formed to fit the grooved frame and hingedly connected to a pair of forward plates so that angular measurements read by the forward plates can be transmitted by the indicator member to a linear indicia located on the frame;
   (d) a locking mechanism mounted on the frame to lock angle readings at desired settings;
   (e) a manual slide button mounted on the indicator member to move the indicator member forward or backward in a linear direction.

16. An angle measuring device comprising:
   (a) a frame having an indicia and grooved to accept a threaded rod;
   (b) a sliding linear indicator member attached to the threaded rod;
   (c) a plurality of upright parallel plates, including a forward pair of plates hingedly connected to each other, hingedly connected with the linear indicator, and hingedly connected to the frame;
   (e) a threaded control knob mounted in the frame and engaged with the threaded rod so that the parallel plates can be advanced or retracted as needed to measure angle displacement;
   (f) a display window with indicia pointer used in combination with indicia of the linear indicator member to display angle readings taken by the forward pair of plates.

17. An angle gauge comprising:
   (a) a frame, grooved to receive a slidable linear indicator member;
   (b) an indicia register mounted on the frame;
   (c) a manual control slide button;
   (d) a locking screw to secure angle settings:
   (e) two pair of upright plate sections hingedly connected to each other, which includes a forward pair of upright plates hingedly connected to the sliding indicator member and a rearward pair of upright plates hingedly connected to the frame;
   (f) the sliding linear indicator member is hingedly connected to the forward pair of plates so that angular measurements read by the forward plates can be translated onto a linear interface and transmitted to the indicia register mounted on the frame.

18. A combination micrometer head and angle gauge comprising:
   (a) a micrometer head with indicia;
   (b) a plurality of plates hingedly connected to each other, and hingedly connected to the micrometer head;
   (c) a transmission means connected to a forward pair of plates for interpreting angular measurements read by the forward pair of plates and transferred to an indicia located on the micrometer head.

19. The angle gauge of claim 18 further comprising a slidable indicator member which is hingedly connected to the pair of forward plates, and a rearward end of the indicator member is connected to the micrometer head.

* * * * *